(12) United States Patent
Clark et al.

(10) Patent No.: US 9,327,446 B2
(45) Date of Patent: May 3, 2016

(54) JOINT STRUCTURE AND METHOD

(71) Applicant: ROLLS-ROYCE PLC, London (GB)

(72) Inventors: Daniel Clark, Belper (GB); Ian Colin Deuchar Care, Derby (GB); Jeffrey Allen, Derby (GB)

(73) Assignee: ROLLS-ROYCE plc, Derby (GB)

( * ) Notice: Subject to any disclaimer, the term of this patent is extended or adjusted under 35 U.S.C. 154(b) by 41 days.

(21) Appl. No.: 14/087,670

(22) Filed: Nov. 22, 2013

(65) Prior Publication Data
US 2014/0161520 A1    Jun. 12, 2014

(30) Foreign Application Priority Data

Dec. 10, 2012    (GB) .................................. 1222112.3

(51) Int. Cl.
*E04B 1/26*    (2006.01)
*B29C 65/64*    (2006.01)
*B29C 65/00*    (2006.01)
(Continued)

(52) U.S. Cl.
CPC ............. *B29C 65/64* (2013.01); *B29C 66/1122* (2013.01); *B29C 66/30321* (2013.01); *B29C 66/41* (2013.01); *B29C 66/721* (2013.01); *B29C 66/7394* (2013.01); *B29C 66/742* (2013.01); *B29C 65/4835* (2013.01); *B29C 65/54* (2013.01); *B29C 65/565* (2013.01); *B29C 66/21* (2013.01); *B29C 66/45* (2013.01); *B29C 66/71* (2013.01); *B29C 66/7212* (2013.01); *B29C 66/72141* (2013.01); *B29C 66/72143* (2013.01); *B29C 66/73753* (2013.01); *B29C 66/73755* (2013.01); *B29C 66/7428* (2013.01); *B29L 2031/08* (2013.01); *B29L 2031/3085* (2013.01); *Y10T 156/10* (2015.01); *Y10T 403/7094* (2015.01)

(58) Field of Classification Search
CPC .................... B29L 2031/3085; B29L 2031/08; B29C 66/72141; B29C 66/72143; B29C 66/21; B29C 66/41; B29C 66/45; B29C 66/71; B29C 66/721; B29C 66/742; B29C 66/1122; B29C 66/30321; B29C 66/7212; B29C 66/7428; B29C 66/7394; B29C 66/73753; B29C 66/73755; B29C 65/54; B29C 65/64; B29C 65/565; B29C 65/4835; Y10T 403/7094; Y10T 156/10
USPC .................. 403/252, 265, 266, 267, 364, 381
See application file for complete search history.

(56) References Cited

U.S. PATENT DOCUMENTS 4,894,060 A * 1/1990 Nestegard ..................... 604/391
5,980,665 A * 11/1999 Childress ........................ 156/92
(Continued)

FOREIGN PATENT DOCUMENTS

GB    1500776 A  *  2/1978
JP    A 59-85392    5/1984
(Continued)

OTHER PUBLICATIONS

Apr. 4, 2013 Search Report issued in British Patent Application No. 1222112.3.

*Primary Examiner* — Gregory Binda
*Assistant Examiner* — Nahid Amiri
(74) *Attorney, Agent, or Firm* — Oliff PLC

(57) ABSTRACT

A joint including a substrate, optionally a metal substrate, and a body of material joined to the substrate, the body of material typically having a composite portion. An outer surface of the substrate is provided with a fastening projection for fastening the substrate to body of material, where the fastening projection has a stem and a plurality of branches having dendritic geometry projecting into the material of the body.

17 Claims, 9 Drawing Sheets

(51) Int. Cl.
  *B29C 65/48* (2006.01)
  *B29C 65/54* (2006.01)
  *B29C 65/56* (2006.01)
  *B29L 31/08* (2006.01)
  *B29L 31/30* (2006.01)

(56) References Cited

U.S. PATENT DOCUMENTS 6,209,177 B1 * 4/2001 Murasaki .................. 24/452
6,461,944 B2 * 10/2002 Neudeck et al. ............ 438/478
7,665,956 B2 * 2/2010 Mitchell et al. ............ 415/115
8,109,734 B2 * 2/2012 Backhouse ............... 416/229 R
8,449,254 B2 * 5/2013 Devore et al. .............. 416/1
8,455,085 B2 * 6/2013 Wanthal .................... 428/156
2008/0003401 A1 1/2008 Barnes et al.

FOREIGN PATENT DOCUMENTS

| JP | A 62-74630 | 4/1987 |
| JP | 07309136 A * | 11/1995 |
| WO | WO 2008/110835 A1 | 9/2008 |
| WO | WO 2010/112904 A1 | 10/2010 |

* cited by examiner

JOINT STRUCTURE AND METHOD

BACKGROUND OF THE INVENTION

This invention concerns joints formed at the interface between adjacent bodies of different materials and, more particularly, although not exclusively to a joint formed with a body of a cured or curable material.

For a number of engineering applications, there is a desire to use composite materials due to the material properties and potential weight savings they can offer. However for many applications it is desirable to form products or components only partly of composite material, whereby the composite material is attached to an adjacent body of different material. The combined material properties may thus be tailored to suit engineering requirements. For example the adjacent material may be provided to improve the strength, temperature resistance or other physical or thermal properties of the final product. In this regard, there is a need to securely join a composite structure to a metallic structure.

Such a need has been identified in aerospace applications, for example with respect to fluid washed bodies, e.g. rotor blades, stator vanes, aircraft wings or the like, although the invention is not limited to such applications.

Previous attempts to address this need include the use of fasteners. Some types of fastener, such as bolts, are designed to pass through apertures in the composite and metallic structures and thereby span the interface there-between. These are disadvantageous as the apertures/bolts interrupt the structure of the composite and metallic materials, thereby weakening the structure and/or providing a site at which stress concentrations can occur. Impacts can cause high stress gradients to occur in the vicinity of the apertures. This can potentially cause damage, particularly to the composite structure.

Also the relatively large thermal mass of the bolts can adversely affect the product upon repeated heating and cooling cycles if the product is intended for use in a hot environment. This can weaken or otherwise reduce the thermal life of the product. Other types of fastener, such as H-section fasteners, are located externally to the composite and metallic structures. However any such fasteners are generally disadvantageous as they increase part count, complexity of assembly and may be subject to the stress concentration problems discussed above. Bolts and other fasteners also have a protruding head formation to hold the fastener in place. Such protrusions are typically unwanted, and can significantly impact aerodynamic efficiency if the product is intended to be fluid-washed in use.

Attempts to address this problem include the use of an adhesive layer between the composite and metallic structures. It is awkward to assemble the composite structure to the metallic structure when adhesive is used. Furthermore this method introduces another material component at the interface, potentially enhancing the problems associated with the material discontinuity.

Debonding, or other detachment, of the composite is a problem due to stress applied at the interface between materials of differing properties. For an adhesive bond, the strength of the interface is dependent on the lowest of: the strength of the composite material; the bond between the metal and adhesive; the bond between the adhesive and the composite; and the adhesive itself. The strength is further reduced by the typically linear nature of the joint which is needed in order to ensure adequate adhesive contact area and application. Thus debonding can propagate along the joint, thereby reducing its strength, impact resistance, vibration resistance and operational life.

There has now been devised an improved joint which overcomes or substantially mitigates some or all of the above-mentioned and/or other disadvantages associated with the prior art.

BRIEF SUMMARY OF THE INVENTION

According to a first aspect of the invention there is provided a joint between a substrate formed of a first material and an adjacent body formed of a second material, whereby the substrate comprises a first surface and the body comprises an opposing surface, the substrate having a fastening projection depending outwardly from the first surface into the adjacent body for retaining the body relative to the substrate, wherein the fastening projection comprises a stem portion adjacent the first surface and a plurality of branches extending into the body, the branches of the fastening projection having a dendritic geometry.

This is advantageous as, if a load is applied to the joint, the branches spread the load over a wider area/volume of the adjacent body than prior art joints. This enables the joint to withstand larger loads, such as impacts, and/or achieve longer operational life than prior art joints.

The branches may terminate within the body. Thus the fastening projection may be embedded within the body. Accordingly the fastening projection may not be exposed to the external conditions in use and may allow the external geometry of the body to be optimised to suit a desired profile.

The stem may be of minimal height such that the branches join at their proximal ends substantially at the first surface.

The substrate may be a metallic substrate. The substrate may comprise, or be formed entirely of, a metal or alloy. The substrate may comprise titanium.

The body is typically a solid body. The body may conform to the first surface. The body may comprise a solidified material. The body may comprise a curable or cured material. The body may comprise a polymer, e.g. a thermosetting polymer, or other resinous material. The body may comprise an epoxy.

The body may comprise a composite material. The body may comprise a composite portion or may be entirely formed of a composite material. The body may comprise a matrix material having reinforcement. The reinforcement may comprise reinforcing elements such as filaments or particulate material. The filaments may be carbon fibres. The matrix may comprise elastomeric material. The elastomeric material may be epoxy.

The fastening projection is typically received within the second material of the body. In some embodiments, the fastening projection is received within a composite material portion of the body. In some embodiments, the body has a connecting region and one or more further regions of different material makeup, the projection being received within the connecting region. The stem and/or branches of the projection may be located within the connecting region. The further region may be a composite region and the projection may not extend into the composite portion. The connecting region may be capable of transmitting load from the composite region to the projection. The connecting region may comprise a resinous material or other solidified material described herein, for example in which the reinforcement is absent.

In some embodiments, the connecting region has the form of a layer located between the composite region and the substrate. In alternative embodiments, the connecting region is located in a cavity in the composite portion. The cavity may have a curved side wall. The side wall may have the shape of the head of a mushroom in section. The cavity may be non-symmetrical and may be biased or lobed in one or more direction. The cavity may be formed using a press tool. The cavity may be formed before the composite portion is cured. Forming the cavity before curing is advantageous as it causes minimal damage to the reinforcement of the composite material.

In some embodiments the reinforcement of the composite material passes over, about or immediately adjacent to the fastening projection. The reinforcement may be intertwined with the branches or may pass between the branches and the surface of the substrate (e.g. beneath the branches or adjacent the stem).

In embodiments in which the fastening projection is received within the composite region of the joining element, elongate fibres of the composite portion may be woven around one or more of the branches or otherwise intertwined with the projections. This can be done without damaging the fibres. This woven structure improves the strength of the joint and reduces the likelihood that large stresses will be experienced in the vicinity of the projection.

The branches may extend at an angle to the substrate surface, e.g. the first surface in the vicinity of the projection. The branches may subtend an angle of between approximately 30° and 60°, for example approximately 45°, to the substrate. The projection may have elongate branches. In any embodiment, retaining surfaces may be provided by or located on the branches. In some embodiments the branches may be curved in form. In some embodiments the branches may be resiliently deformable.

There may be one or more primary branches extending from the stem. There are preferably two or more primary branches. The two, or adjacent, primary branches may generally define a V-shape and each primary branch may subtend an angle of approximately 30-60°, e.g. 45°, to the surface of the substrate. The spaced ends of the primary branches may be separated by a distance of between 1 and 20 mm, or more typically between 1 and 12 mm.

A secondary branch may extend from one or more of the primary branches. The secondary branch or branches may extend at an angle between 70° and 110°, or 75° and 105°, such as for example approximately 90° to the primary branch from which they extend. The secondary branch or branches may extend from part-way, e.g. approximately mid-way, along the length of the primary branch from which they extend.

One or more further or tertiary branch may extend from one or more of the secondary branches. The tertiary branch may extend at an angle between 70° and 110°, or 75° and 105°, such as for example approximately 90° to the secondary branch from which they extend. The tertiary branch or branches may extend from part-way, e.g. approximately mid-way, along the length of the secondary branch from which they extend.

The branches of the fastening projection have a dendritic geometry. In particular, the projection may have two or more levels of branching. At the first level of branching there is a single node from which a plurality of primary branches extend. At a second level of branching there are a plurality nodes, e.g. corresponding to the number of primary branches, at which each of the primary branches branch, thereby creating a secondary branch. At the third level of branching there are four or more nodes, e.g. at which both the primary and secondary branches produce a tertiary branch. The relationship between the levels of branching and the number of nodes at each level may follow the Fibonacci sequence. At each level, branches may bifurcate, trifurcate or quadfurcate.

All of the branches may lie in the same plane, for example in the example of a bifurcating branch sequence. The branches may be symmetrically or non-symmetrically arranged or distributed about the stem.

The stem may be upstanding from the surface of the substrate. The primary branches may extend from a distal region of the stem. A width, diameter or lateral dimension of the stem may be larger in the vicinity of the surface of the substrate than in the vicinity of the branches. The stem may have the form of a truncated cone. A rounded chamfer may be provided in the region of intersection of the two primary branches.

The projection may be generally symmetrical in one or both of the planes orthogonal to the plane of the surface of the substrate.

The height of the projection may be between 1 and 10 mm. The spread of the branches at their outermost tips (i.e. defining the widest point of the projection) may be between 1 and 10 mm. Spacing between adjacent projections may be of a similar order. Branches of adjacent projections may interfere or overlap.

The primary and/or secondary and/or tertiary branches may be elongate in form. The stem and/or branches may be of generally constant width/diameter or tapered along their length. Each branch may taper, i.e. reduce in width, towards its distal or free end. This is advantageous as the stiffness of the branches may decrease towards the free ends of the branches. This spreads the load better than prior art arrangements. Additionally or alternatively, the stiffness of the branches may be tuned (e.g. by modifying branch thickness) to provide vibration damping properties over operational frequency ranges. The free ends of the branches may be rounded.

The volume of branch material at each level of branching may be approximately constant or generally decreasing with distance from the substrate surface. Nodes may comprise regions of isolated increased material thickness, e.g. to strengthen the intersection between branches.

Each branch may be generally circular in section.

Discontinuities or perturbations may be present in the branches. Such formations may comprise ridges, troughs, projections, ribs or similar. This improves the bonding of the branches to the material of the body.

The fastening projection may be provided with an internal cavity. This is advantageous as it enables the stiffness of the projection to be selected. The cavity may be provided in the stem and/or the primary branches. The cavity may extend axially through the interior of the stem or primary branches. The cavity may be adapted to receive and/or retain a stiffener. The stiffener may comprise a medium.

The joint may comprise a plurality of fastening projections, each having some or all of the features noted above in relation to the fastening projection. The plurality of projections may be arranged in a two-dimensional array over the substrate surface. The projections may be evenly distributed or else the spacing may vary to suit requirements, such as according to predicted loading distributions in use.

The plurality of fastening projections may be arranged on the surface of the substrate in at least one line and may be arranged according to the rules of the Cantor Set. The plurality of projections may include projections of different sizes.

The surface of the substrate may be curved or flat.

The composite portion of the joining element may include a plurality of layers, each layer comprising a polymer matrix reinforced with elongate fibres. The composite material may be a woven composite, i.e. in which the layers are woven together with elongate fibres. Other fibre arrangements may be used, such as laid fibre arrangements, including for example bundles of filaments. The polymer matrix may comprise an epoxy material. The fibres may comprise carbon fibres. In some embodiments, the distance between adjacent layers of the composite material is greatest in the vicinity of the substrate. In some embodiments, the body has portions which are curved or discontinuous in form.

In any embodiment, the fibres may be straight, curved or coiled in form and/or may be provided as bundles or clusters of filaments, for example as tows or tapes.

The fastening projection may be formed on, or co-formed with, the surface of the substrate by an additive manufacturing technique, for example in the projection is built up by applying a high power beam to a powder material adjacent the substrate. A direct laser deposition (DLD) method may be used. A blown powder deposition process may be used. Metal powder may be applied continuously or in layers on top of one another and the powder may be selectively fusion bonded together to form a desired metal structure. The metal structure is thereby joined to the substrate on which, or with which, it is formed. DLD is advantageous as it enables the formation of projections having complex 3D geometries. As an alternative to DLD, a preformed fastening projection could be welded or otherwise bonded to the surface of the substrate.

According to a second aspect of the invention, there is provided a component comprising the joint of the first aspect.

The body may be arranged to provide an outer surface of the component. The body may provide a cover or partial cover over the substrate. The substrate may comprise a support structure for the body and may be stronger than the material of the body.

The component may comprise a fluid-washed component in use. The component may comprise an aerofoil, such as a blade or vane. The component may comprise an aerospace component. The component may comprise an aircraft or engine component. The component may comprise a component of an axial flow machine, e.g. a gas turbine engine.

According to a third aspect of the invention there is provided a method of forming a joint between a substrate formed of a first material and an adjacent body formed of a second material, the method comprising providing a fastening projection on an outer surface of the substrate, the fastening projection having a stem portion depending from the outer surface and a plurality of branches having a dendritic geometry, applying a volume of the second material at least partially in a liquid state over at least a portion of the outer surface such that fastening projection extends into the second material and allowing the second material to solidify so as to form a solid body held adjacent the substrate by the fastening projection embedded therein.

Any of the optional features defined above in relation to the first aspect may be applied to the second or third aspect.

BRIEF DESCRIPTION OF THE DRAWINGS

Practicable examples of the invention will now be described in further detail, for illustration only, with reference to the accompanying drawings, in which.

DETAILED DESCRIPTION OF THE INVENTION

Figure 1A:
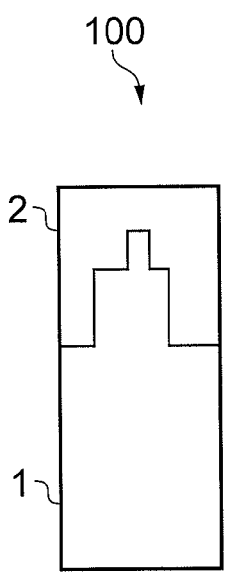
FIG. 1 shows sectional views of (a) a portion of a prior art joint and (b) a portion of a joint according to the invention.
Figure 1B:
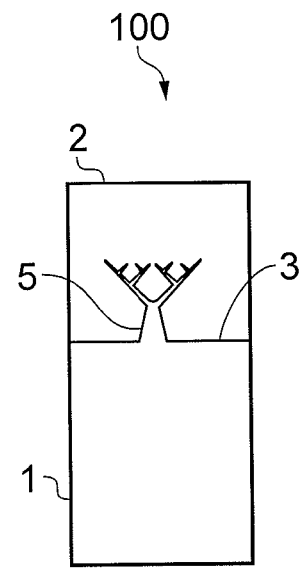

The invention derives from the realisation that is possible to form structures or fasteners on an outer surface of a substrate which can be embedded in a liquid phase material so as to improve the load-bearing capacity or other operational parameters of the combined structure once the liquid phase material has solidified. One particular implementation of the invention is a joint 100 between a substrate 1 and a composite body 2. A portion of such a joint 100 is shown in FIG. 1(*b*). The substrate and composite body are herein referred to as respective metal 1 and composite 2 elements of the joint.

Figure 2:
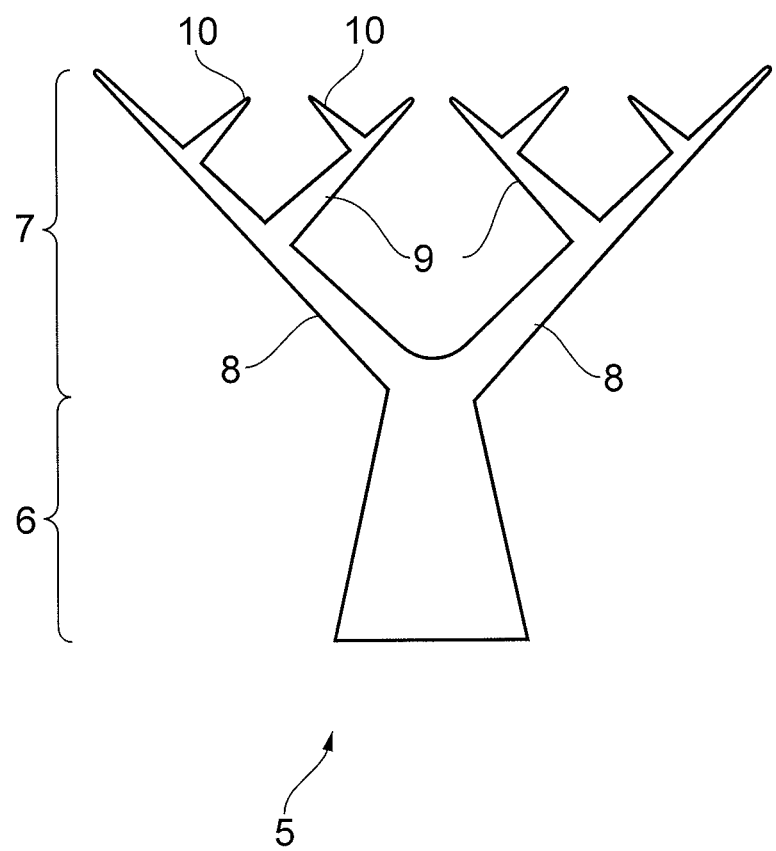
FIG. 2 is a cross-sectional view of an example of the fastening projection according to the invention.

An upper surface 3 of the metal element 1 is provided with fastening means for fastening the metal element 1 to the composite 2. The fastening means is a plurality of fastening projections 5. The fastening projections 5 are tree-like or tree-root-like, e.g. biomimetic, in form and are upstanding from the upper surface 3 of the metal element 1. The fastening projections 5 are shown most clearly in FIG. 2. The projections 5 are typically formed in the material of the substrate (i.e. metal in this example) and can be made integral with the metal element 1. The composite element 2 lies on the upper surface 3 of the metal element 1. The projections 5 are integrated into the composite element 2, so as to connect the metal element 1 to the composite element 2.

The metal element 1 comprises titanium and may be formed of a conventional titanium alloy. The upper surface 3 of the metal element 1 is smooth and generally flat although the surface may be perturbed as necessary.

Each projection has a stem or trunk portion 6 and a branched portion 7. The trunk portion 6 in this example has the form of a truncated cone of circular cross-section, although any other upstanding trunk shape may be used. The trunk portion 6 in this example tapers inwardly from bottom to top. The branched portion 7 comprises two primary branches 8, two secondary branches 9 and four tertiary branches 10. Each branch 8, 9, 10 has the form of an elongate cone, of circular cross-section, tapering radially inwardly towards the free end of the branch. All of the branches 8, 9, 10 lie within the same plane in this example but in other examples, the branches may be offset so as to form a three-dimensional structure in which different branches extend in different planes.

The two primary branches 8 extend from the upper end of the trunk portion 6. The primary branches 8 each extend at approximately 45° to the axis of the trunk portion 6, such that an angle of approximately 90° is defined between the primary branches 8. The generally upwardly-facing surfaces of the primary branches 8 in the region of intersection of the primary branches 8 is generally rounded in the plane in which the branches lie. The diameter of the primary branches 8 at their base, i.e., the maximum diameter of the primary branches 8, is approximately 5 mm.

The secondary branches 9 each project from the generally upwardly-facing surface of each respective primary branch 8, from a location approximately mid-way along the primary branch 8.

A tertiary branch 10 projects from the generally upwardly-facing surface of each of the primary branches 8. These tertiary branches 10 project from the surface approximately mid-way between the secondary branch 9 and the free end of the primary branch 8.

Furthermore, a tertiary branch 10 projects from the generally upwardly-facing surface of each of the secondary branches 9. These tertiary branches 10 project from the surface at approximately two-thirds of the length of the secondary branch 9.

Each of the secondary 9 and tertiary 10 branches extends at approximately 90° to the branch from which they project.

The free ends of all the branches 8, 9, 10 are rounded in form. Nodes, at the intersection between branches, may also be bulbous or rounded in form. The tertiary branches 10 are shorter than the secondary branches 9, which are, in turn, shorter than the primary branches 8, such that the free ends of all of the branches 8, 9, 10 are separated from the upper surface 3 of the metal element 1 by a similar distance.

Figure 8:
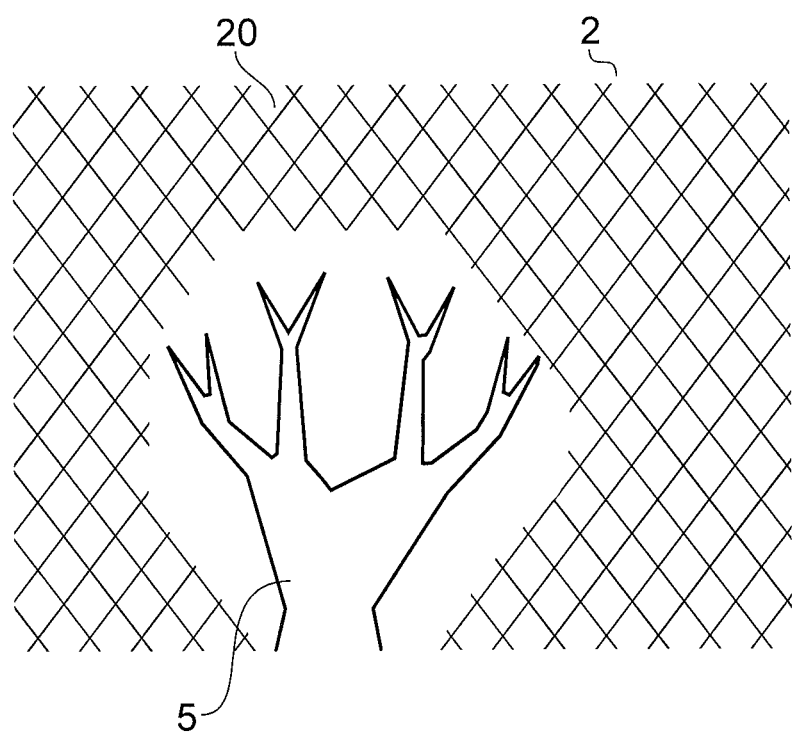
FIG. 8 is a schematic, cross-sectional view of a portion of a joint according to the invention, including the composite element and the fastening projection; and, FIG. 9 is a cross-sectional view of an example of two fastening projections which may be present in a joint according to the invention, the two fastening projections being of different sizes.

Different configurations of the fastening projections 5 are also envisaged. An example of a portion of a joint having a fastening projection 5 with a different configuration is shown in FIG. 8. Thus it will be appreciated that in other embodiments the primary branches may terminate at the second level of branching, i.e. at the secondary branches. Additionally or alternatively, the angle subtended between the branches at the same level may differ from the angles described above. It is envisaged that a minimum angle between branches of the same level will be approximately 30°, whereas a maximum angle between said branches would be approximately 120°. Such angles may allow the tips of the branches to be suitably spaced to avoid interference and to allow loads in use to be adequately spread through the composite element.

Additionally or alternatively, the length of the branches at the same level of the fastener structure may be of differing length.

Furthermore the shape and/or angle of the branches may be optimised for additional reasons, such as to provide space between branches to allow insertion of fibres therebetween as will be described below. Additionally or alternatively the branch angles may be optimised for packing density and/or to spread applied loads over a desired area/volume in use. For any of the above reasons it may be beneficial that the fibres are curved in form rather than being straight.

In view of the above options, it will be appreciated that the tips of the tertiary branches may terminate at different heights above the surface 3 of the substrate.

The branches 8, 9, 10 are provided with macroscopic cut-outs, grooves or other types of recess or detent (not shown). Such formations may extend along the trunk and/or branches and may thus be elongate in form. Alternatively such formations may extend around or about the trunk and/or branches. These features may improve the strength of the bond between the metal element 1 and the composite element 2 by allowing the matrix material of the composite to enter and thereby key with the formations.

Figure 3:
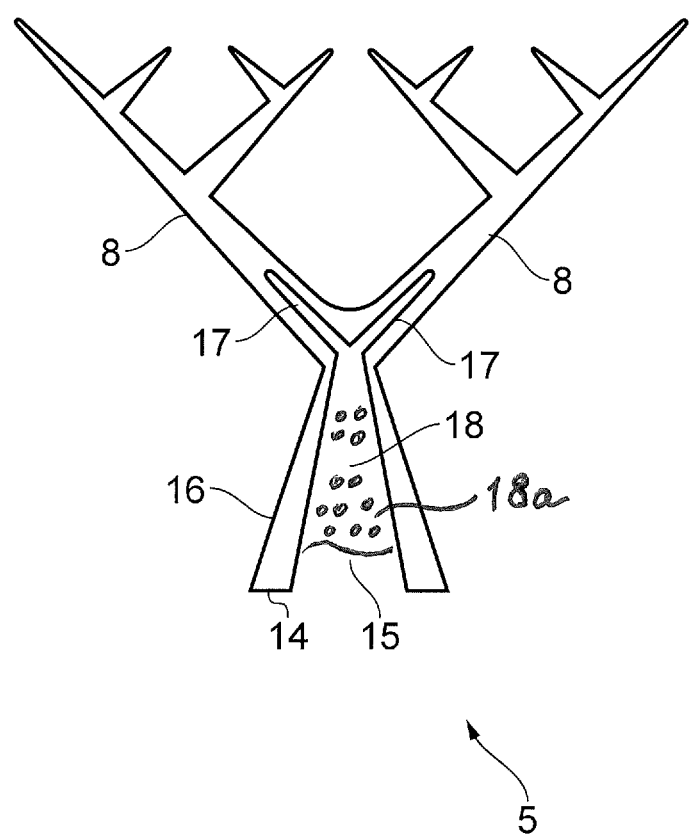
FIG. 3 is a cross-sectional view of the fastening projection according to the invention in which the fastening projection is provided with a stiffness-regulating bore.

In some embodiments, the base 14 of the trunk portion 6 is provided with a stiffness-regulating bore or cavity 15, see FIG. 3. The stiffness-regulating bore is generally conical in form or may be otherwise shaped to match the form of the trunk. The bore 15 in this example extends axially through the whole of the trunk portion 6, so that the material of the trunk defines a generally peripheral wall trunk 16. The bore 15 is tapered to a lesser extent than the trunk portion 6. This means that the thickness of the side wall 16 decreases from bottom to top. The maximum thickness of the side wall 16 may be approximately 0.5 mm in this example but may vary between different applications of the invention depending on size and other engineering requirements.

A stiffness-regulating bore 17 is also provided in each of the primary branches 8, extending part-way along each branch, for example by a distance of approximately one quarter of the length of each primary branch 8. The stiffness-regulating bore 17 is generally conical in form. These bores 17 may be tapered to a lesser extent than the primary branches 8 in which they are defined, or else may be of constant width. The bores 15, 17 in the trunk 6 and branches 8 are linked so as to define a cavity 18 in which a filler material 18*a* is received, as illustrated in FIG. 3. The filler may comprise a visco-elastic material. The filler may be selected or may be avoided in order to give the fastening projection 5 a desired stiffness. The filler material may be the same as the resinous material of the composite body 2.

In any example, the wall thickness of the material used for the trunk or branches may be between 0.1 and 1.0 mm, typically around 0.5 mm. The stiffness of the trunk and branches may be graded to achieve a desired heat and/or load transfer profile in use. Accordingly the trunk and/or branches may be otherwise tailored to suit this purpose, for example by providing hollow and/or skeletal trunk/branch formation. For hollow formations, holes may be provided for ingress of resin and/or egress of air during manufacture.

The fastening projection 5 may be formed on the upper surface 3 of the metal element 1 by an additive manufacturing process, e.g. a free form additive manufacturing process, such as Direct Laser Deposition (DLD). This method works by directing a laser in order to fusion bond successive layers of metallic powder, e.g. as a powder bed, onto a metal substrate in order to produce a metallic formation which is joined to the substrate. The laser thus energises the powder at the desired location to form a bonded layer. A new layer of powder is provided atop the bonded layer so as to build up the desired structure from the surface. This method of manufacture is in many ways preferred for the present invention as it is suited to the production of metallic formations having fine features and/or complex geometry, such as the branches of the present invention. It is a known feature of such techniques that a scaffold may be formed in the powder bed to support the formation being constructed. It is possible in examples of the present invention that, instead of removing any such scaffold once formed, the scaffold could itself take the form of a branching structure and could remain intact on the substrate to provide additional fastening projections.

In other embodiments, different high-energy beam technologies, e.g. electron beams, could be used to form the projections on the substrate surface, provided the beam can be suitably controlled and directed as necessary. Also continuous powder deposition techniques could be used, instead of forming individual layers. In one embodiment, it is possible that the surface of the substrate could itself be formed at the same time as the fastening projections. Alternatively, the projections may be later formed on an existing substrate surface. Alternatively, it is possible that the fastening projections could be formed separately and then welded or otherwise bonded or affixed to the substrate surface.

The fastening projections 5 are arranged on the surface 3 in a two-dimensional array, which may display a generally regular pattern (i.e. projection spacing) over the surface of the metal element. The projections in this embodiment are spaced according to the rules of the Cantor Set or otherwise topographically optimised according to local loading requirements. This is to improve the uniformity of the spacing of the branches 8, 9, 10 over the surface 3. Furthermore, the branches 8, 9, 10 of all of the formations 5 in this embodiment may lie in the same plane. Thus the spacing between neighbouring projections 5 in one direction is different to the spacing in a perpendicular direction.

The regular spacing of the projections may be set to achieve a desired spacing between the tips of the tertiary branches of adjacent projections. However the projection spacing and orientation may be tailored in a different manner to suit different requirements if necessary. For example, projections may be concentrated (i.e. at reduced spacing) in areas in which loading (e.g. shear or tensile loading on the joint) is predicted to be higher in use. If the metal element surface is curved, the spacing of the projections may be adjusted accordingly to suit the desired engineering goal.

It is preferable that the spacing of the projections, i.e. the trunks thereof, is controlled such that there is a substantially even distribution of branch tips at the tertiary branch level. For example it may be desirous that there is an even distribution of branch tips between adjacent projections or else that the branches of adjacent projections may interfere to provide a mechanical interlock in use. In one example of the invention, a mathematical model or algorithm for the projection spacing may be determined. For example, a model of the joint may be created using a Finite Element Analysis (FEA) package in order to determine the stress distribution under loading and spacing may be set with the aim of achieving a substantially even stress distribution (i.e. an arrangement in which an impact or point load is communicated as far as possible across the entire array of projections).

The composite element 2 may be for example a carbon fibre composite structure, the carbon fibres 20 being located, for example, within an organic polymer matrix. However a wide variety of conventional composite material combinations could be suitable. In the present example, the structure 2 comprises a layered arrangement having a plurality of laminae (not shown), each layer typically consisting of carbon fibres 20 extending substantially unidirectionally within the matrix. Such a structure or lay-up may be built up by the laying of successive layers one atop the other such that the layers become a continuous body upon hardening of the matrix material. The orientation of the carbon fibres of successive laminates may differ and such orientation changes may follow a repeating pattern. Any of knitted, woven, laid or other fibre arrangements may be used. In some embodiments it is preferable to use pre-bundled fibres in the form of tows, twisted bundles or tapes which are arranged as required rather than arranging individual fibres.

Figure 4:
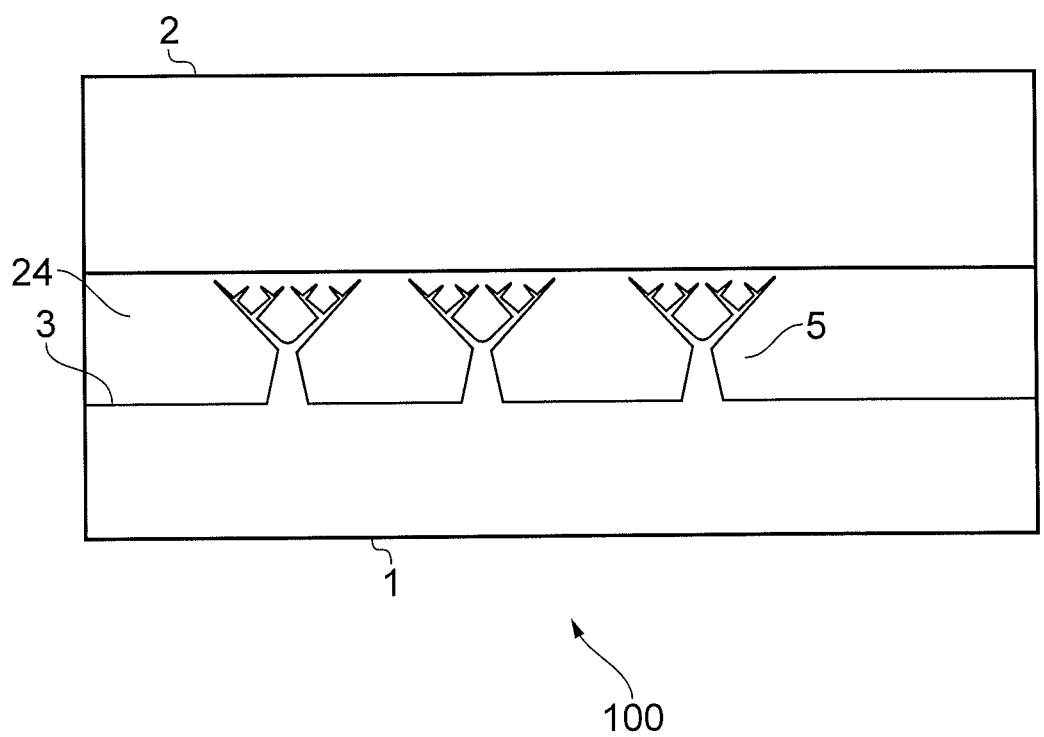
FIG. 4 is a cross-sectional view of a portion of a joint according to the invention, in which a layer of material has been applied to the upper surface of the substrate.

In some embodiments, such as that shown in FIG. 4, a curable material layer 24 is applied to the upper surface 3 of the metal element 1, the layer 24 having a depth which is greater than the height of the fastening projections 5 from the upper surface 3 of the metal element 1. The composite element 2, e.g. in partially-cured form, may be laid on top of the layer 24. The composite element 2 can then be cured such that the composite element 2 bonds to the layer 24.

Figure 5:
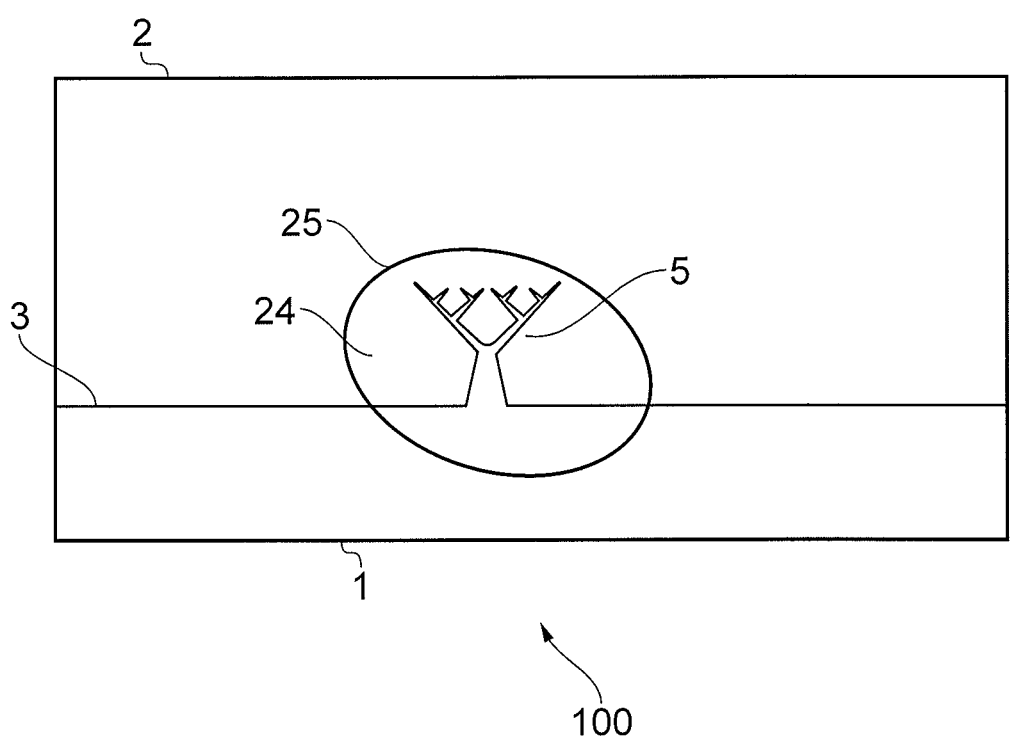
FIG. 5 is a cross-sectional view of a portion of a joint according to the invention, in which a fastening projection is located within a recess in a composite material reinforcement.
Figure 6:
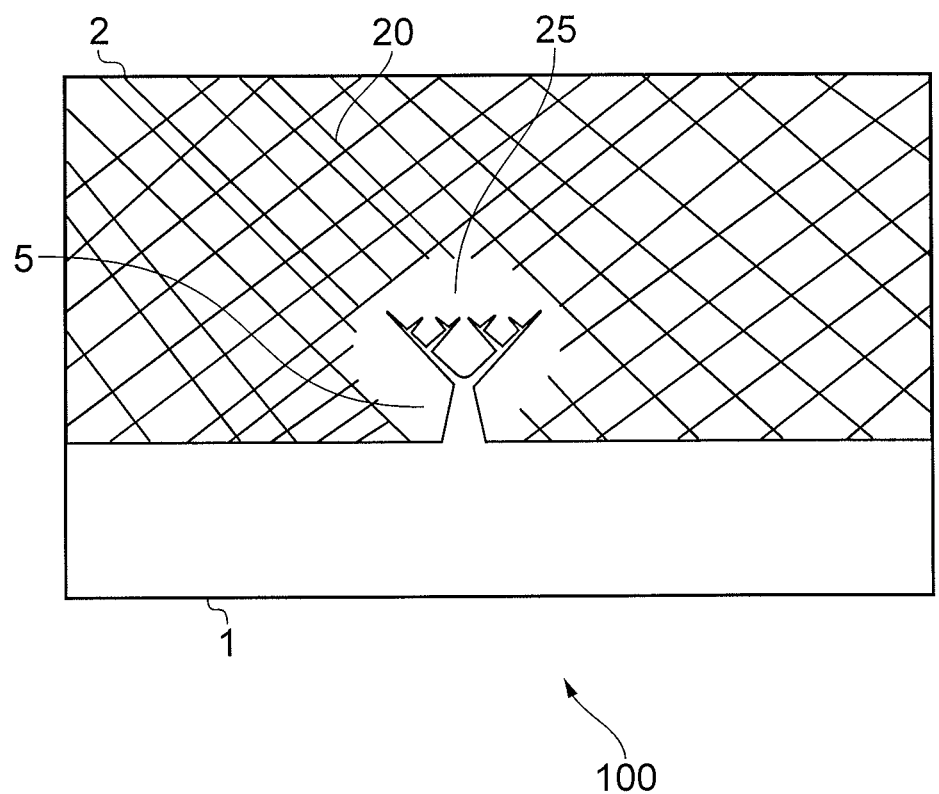
FIG. 6 is a schematic, cross-sectional view of a portion of a joint according to the invention, in which the reinforcement of the composite material is shown.

In alternative embodiments, such as those shown in FIGS. 5, 6 and 8, pockets or recesses 25 are formed in the lower surface of the composite element 2. The pockets 25 may be formed in the reinforcement alone or else in the reinforcement and matrix material of the composite. The pockets are shaped to correspond to the shape of the projections and may generally have the shape of the head of a mushroom. The pockets 25 can be formed using a machine tool or a press tool. Alternatively, the pockets 25 can be formed during lay up of the composite element 2. In some embodiments, the reinforcement and/or composite body may be formed with a sacrificial material therein, which is shaped to define the pocket. The sacrificial material can later be melted or dissolved for example to leave the desired pocket formation.

When formed, the pockets 25 may be filled with a curable material 24 either before or after insertion of the projections. The composite element 2 is laid or placed on top of the metal element 1 such that the fastening projections 5 are received in the pockets 25. The joint is then cured to secure the composite element 2 to the resin 24.

Insertion of the projections 5 into the pockets 25 may cause the branches 8, 9, 10 of the projection 5 to splay, e.g. either plastically or elastically. For example the body of the composite element 2, minus the pocket formations, may be cured or partially cured before being applied to the substrate. Accordingly the composite material defining the pockets may press against the branches upon application thereto so as to deform the branches into a desired orientation for use. This is particularly advantageous to allow the branches to take an initially more-upright configuration so that fibres can be located between adjacent projections prior to deformation of the branches to a splayed or less-upright configuration at which the branches can be set in the final product. Thus pressure may be applied to the projections during application of the composite.

In any embodiment, the branches may be deformable upon application of the composite thereto and may adopt a straight or curved profile either prior to or after deformation. The branches may otherwise be curved to suit a desired shape in use, whether or not they are deformed during manufacture.

The fact that the projections 5 are small in size means that the pockets 25 can be made relatively small. Thus the formation of the pockets 25 does not cause substantial separation of the fibres 20 of the composite element 2.

Figure 7:
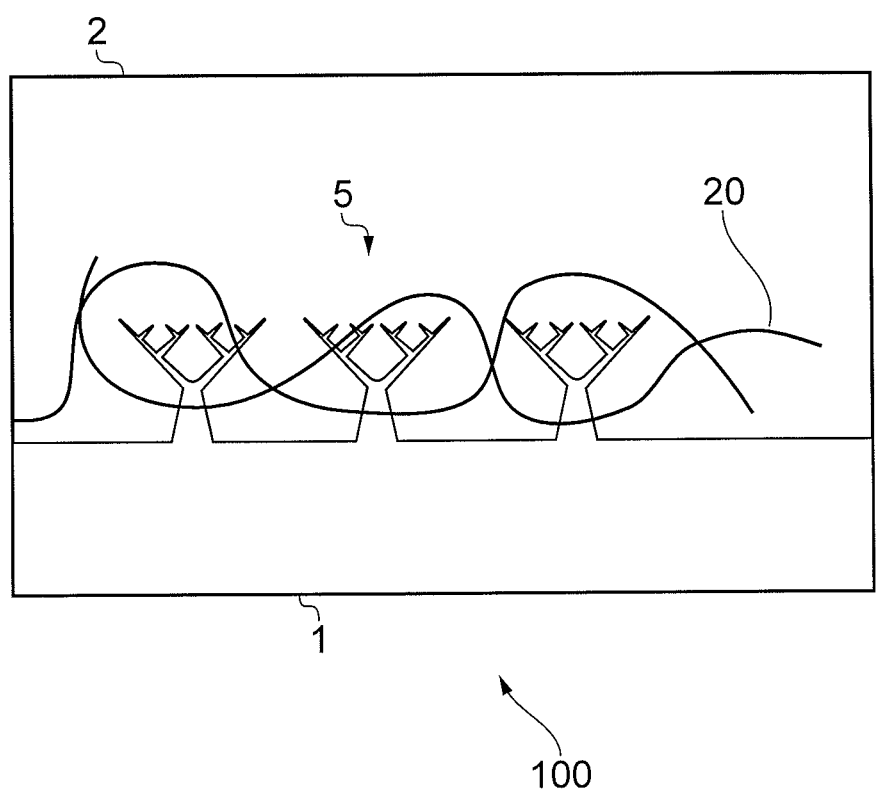
FIG. 7 is a schematic, cross-sectional view of a portion of a joint according to the invention, in which some of the reinforcement elements of the composite material are woven or wrapped around the fastening projections.

In alternative embodiments, such as that shown in FIG. 7, the fibres 20 of the composite 2 are wound or woven around the fastening projections 5 when the composite element 2 is laid on top of the metal element 1. The fibre lay-up may thus be formed about the projections or applied to the substrate as a wet preform, prior to curing. The fibres may thus interfere with or otherwise interlace with or be held within one or more projections. In another example, the fibre layup could be splayed locally to allow introduction of the projections into the composite reinforcement structure. The fibres may then naturally close about the projections in situ or else may remain splayed if it is desirous to isolate the projections from the reinforcement structure.

In some examples, the projections and or substrate surface may be dipped or otherwise provided with a resinous material in liquid form prior to application of the composite body thereto.

The bond between the fastening projections 5 and the composite element 2 securely connects the composite element 2 to the metal element 1. If the composite element 2 experiences an impact, the force of the impact is transmitted through the composite element 2 to the fastening projections 5. The fastening projections 5 apply a reaction force to the composite element 2. In particular, each of the branches 8, 9, 10 of each projection 5 applies a reaction force to an adjacent region of the composite element 2, either directly or through the resin. The branched form of the projections 5 means that the reaction force is spread over a large area of the composite element 2, thus reducing the stress experienced by the composite element 2 compared to prior art arrangements.

Furthermore, the impact causes the fastening projections 5 to flex or bend, absorbing the force of the impact. As the extent of this bending depends on the stiffness of the projection 5, the choice of stiffener affects the extent to which the force of the impact is absorbed. Therefore, the stiffener is chosen to have mechanical properties which are suited to the particular application.

Furthermore, if a force which acts to separate the composite element 2 from the metal element 1 is applied to the composite material 2, the tension in the trunk and branches act to resist such separation. Furthermore, the length of the branches causes the tensile load to be spread over a substantially large region of the composite material 2.

In some embodiments (not shown), the layers of the composite element in the vicinity of the interface between the composite element 2 and the metal element 1 may be widened or splayed relative the laminate layers in the rest of the composite element 2. This may serve to spread the load of an impact away from the interface.

In view of the above, it will be appreciated that interaction between the fibres in a composite structure and the projections may provide useful load bearing properties and may heighten the advantages offered by the invention to certain scenarios. However in other examples, the projections may be removed or isolated from the reinforcement structure of the composite and may be held within the curable material, e.g. resin, only. Thus it will be appreciated that, whilst it is considered beneficial to apply the invention to composite materials, it is not essential, and the invention may be used to form a join with any resinous, or otherwise hardenable material that can be applied in a suitably liquid form. Furthermore, in composite examples, it is possible to use reinforcement structures other than long fibres, such as particulate reinforcement, chopped fibres or similar.

In one embodiment, the fibres could be introduced into the additive/deposition region while forming the projections on the metal element 1. Thus the fibres may pass amongst and/or through the projections themselves.

Figure 9:
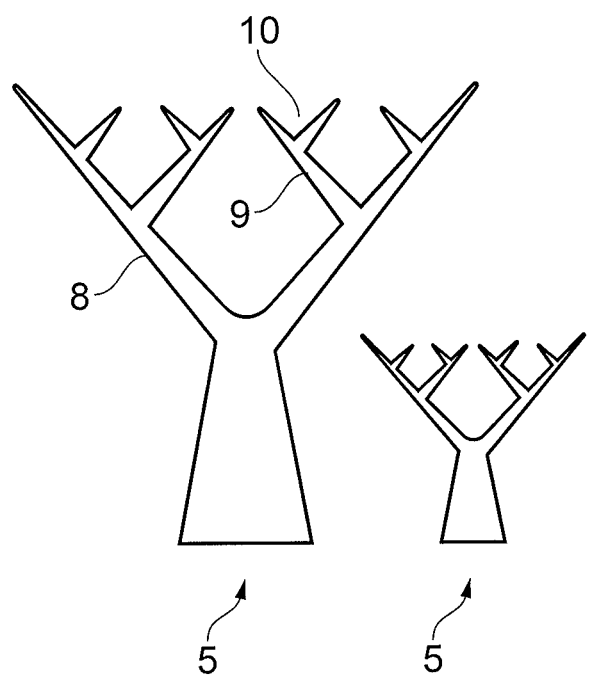

In further examples of the invention, the upper surface 3 of the metal element 1 may be provided with fastening projections 5 of different sizes, see FIG. 9. As the composite element 2 could have a variety of different shapes and structures, the dimensions of each projection 5 are chosen to suit the characteristics of the region of the composite element 2 in the vicinity of the projection 5. This is done in order to maximise the contact area between the projections 5 and the composite element 2.

The invention can be tailored to accommodate various different composite manufacture techniques and may allow for three-dimensional, as well as two-dimensional, layups, for example in which ties or other connecting features are provided between composite layers.

The invention is particularly well suited to the manufacture of aerospace components and may be used for example in relation to aircraft wing or fuselage attachments, other aerofoil jackets or covers, bladed ring ('Bling') manufacture or other gas-washed surfaces. The suitability for aerospace applications is at least in part due to the high engineering demands on such components and accordingly the invention may be applied to other technical fields in which such demands exist.

In further examples of the invention, the projection structure may be used to bond other materials to those described above. For example the invention may also be applied to the joining of ceramic materials, e.g. ceramic matrix composites, or metal matrix composites to a metal or other substrate. The invention could be used to provide a joint between a metal matrix composite and an organic matrix composite. In any examples of the invention, the body of material applied to the substrate may be provided as a cover, for example to provide any or any combination of environmental, thermal and/or electrical protection for the substrate. The cover may be provided as a gas or liquid washed outer surface.

In developments of the concepts described above, additional or alternative manufacturing processes for the projections may be realised. For example, projections could potentially be formed of an open cell foam material by Physical Vapour Deposition (PVD) metallising and plating an organic substrate. The organic substrate could be generated as a stereo-lithographic structure. Alternatively, projections could be moulded, e.g. using metal injection moulding, in the event that the mould can be subsequently dissolved.

Furthermore, it has been found that the provision of fastening projections which generally increase in span with distance from the substrate surface can be used to attach further components to the substrate or otherwise embed components in the product. For example a sensor, e.g. MEMS device, or other micro-electronic device could be located between a plurality of fastening projections and held beneath the branches thereof so as to secure such device within the structure of the product.

Also it has been proposed that the fastening projections could be formed from a selectively decomposable material for removal in future. This would allow the projections, and composite to be removed at a later date using chemicals or UV light, etc for replacement, inspection or other reasons.

In the varying different applications described, the magnitude and/or spacing of the projections may be changed as necessary to provide any, or any combination, of the benefits described above.

It will be understood that the present invention has been described in relation to its preferred embodiments and may be modified in many different ways without departing from the spirit and scope of the invention as defined by the accompanying claims.

The invention claimed is:

1. A joint between a substrate and an adjacent body, the substrate comprising a first metal material and having a first surface and the adjacent body being formed of a second material and having an opposing surface, the joint comprising:
    a fastening projection extending outwardly from the first surface into the adjacent body for retaining the adjacent body relative to the substrate, the fastening projection defining a stiffness-regulating cavity and including:
        a stem portion adjacent the first surface,
        a first plurality of branches extending from the stem portion, and
        a second plurality of branches extending from at least one branch of the first plurality of branches,
    wherein (i) at least one branch of the first plurality of branches and at least one branch of the second plurality of branches define a dendritic structure and (ii) the first plurality of branches and the second plurality of branches are embedded into the adjacent body such that the branches disperse a load applied to the joint over a wider area or volume of the adjacent body.

2. The joint as claimed in claim 1, wherein the first and second plurality of branches are obliquely inclined relative to the first surface and/or the stem portion.

3. The joint as claimed in claim 1, wherein at least two branches of the first plurality of branches are primary branches extending outward from a proximal end, at which the primary branches meet, to a distal end, at which the primary branches are spaced apart.

4. The joint as claimed in claim 3, wherein the primary branches generally define a V-shape or U-shape.

5. The joint as claimed in claim 4, wherein a secondary branch extends from one or more of the primary branches.

6. The joint as claimed in claim 5, wherein the secondary branch extends from a side or end of the primary branch and is angularly offset from the primary branch.

7. The joint as claimed in claim 5, wherein a tertiary branch extends from a side or end of at least one branch of the second plurality of branches.

8. The joint as claimed in claim 1, wherein the branches of the first plurality of branches and of the second plurality of branches all lie in the same plane.

9. The joint as claimed in claim 1, wherein the material of the adjacent body includes a solidified or cured material.

10. The joint as claimed in claim 1, wherein the material of the adjacent body includes a composite material having a matrix material and a reinforcement material.

11. The joint as claimed in claim 10, wherein the adjacent body includes a first region that is adjacent the first surface and that only includes the matrix material, the fastening projection being received in the first region.

12. The joint as claimed in claim 10, wherein the composite material includes a fiber reinforcement structure with fibers that pass about or between the stem and/or branches of the one or more fastening projections.

13. The joint as claimed in claim 1, further including a plurality of the fastening projections at spaced locations over the first surface.

14. A component comprising the joint as claimed in claim 1.

15. The component according to claim 14, wherein the substrate and the adjacent body form portions of an aerofoil component.

16. The joint as claimed in claim 1, further including a filler material disposed within the stiffness-regulating cavity.

17. The joint as claimed in claim 16, wherein the filler material includes a visco-elastic material.

* * * * *